United States Patent [19]

Ito

[11] Patent Number: 5,179,065
[45] Date of Patent: Jan. 12, 1993

[54] RECORDING MATERIAL WITH A DISPLAY COMPOSITION INCLUDING A COLORING PIGMENT

[75] Inventor: Kengo Ito, Kanagawa, Japan

[73] Assignee: Sony Corporation, Tokyo, Japan

[21] Appl. No.: 892,137

[22] Filed: Jun. 2, 1992

Related U.S. Application Data

[62] Division of Ser. No. 514,290, Apr. 25, 1990.

[30] Foreign Application Priority Data

Apr. 28, 1989 [JP] Japan .................. 1-111763

[51] Int. Cl.$^5$ .................. B41M 5/20; B32B 7/00; C09D 11/00
[52] U.S. Cl. .................. 503/202; 503/225; 106/21 A; 428/204; 428/206; 428/913
[58] Field of Search .................. 106/21; 503/225, 202; 428/204, 206, 913

[56] References Cited

U.S. PATENT DOCUMENTS

| | | | |
|---|---|---|---|
| 2,695,245 | 11/1954 | Compton | 427/203 |
| 3,950,180 | 4/1976 | Kato | 106/468 |
| 4,341,565 | 7/1982 | Martenson | 106/486 |
| 4,746,570 | 5/1988 | Suzuki et al. | 106/DIG. 3 |
| 4,875,762 | 10/1989 | Kato et al. | 359/241 |
| 4,963,192 | 10/1990 | Dessauer | 106/487 |
| 5,028,351 | 7/1991 | Kato et al. | 106/416 |

FOREIGN PATENT DOCUMENTS

| | | |
|---|---|---|
| 0294724 | 12/1988 | European Pat. Off. . |
| 50-8462 | 4/1975 | Japan . |
| 57-35753 | 2/1982 | Japan . |
| 62-256724 | 11/1987 | Japan . |
| 63-90573 | 4/1988 | Japan . |
| 64-87508 | 3/1989 | Japan . |
| 773180 | 4/1957 | United Kingdom . |

OTHER PUBLICATIONS

Derwent Abstract of Japanese, Published Application No. 8462 of 1975.
Patent Abstracts of Japan, vol. 6, No. 104 (p-122) [982] Jun. 15, 1982, Abstract of Japanese Published Application 57-35753 of Feb. 26, 1982.

Primary Examiner—Shrive Beck
Assistant Examiner—Helene Klemanski
Attorney, Agent, or Firm—Hill, Van Santen, Steadman & Simpson

[57] ABSTRACT

Disclosed herein is a display composition which comprises a dye and a clay mineral in which quaternary ammonium ions are bound between layers through ion exchange, said display composition undergoing reversible color development and color fading through the oxidation and reduction of said dye, the oxidation causing said dye to form a color and to be bound between the layers of said clay mineral through ion exchange with said quaternary ammonium ions, the reduction causing the dye to discolor and to be desorbed out of the interlaminar space of the clay mineral and also causing the quaternary ammonium ions to be bound again between the layers through ion exchange. Disclosed also herein are a coloring pigment and recording material which employ the display composition.

1 Claim, 3 Drawing Sheets

FIG. I
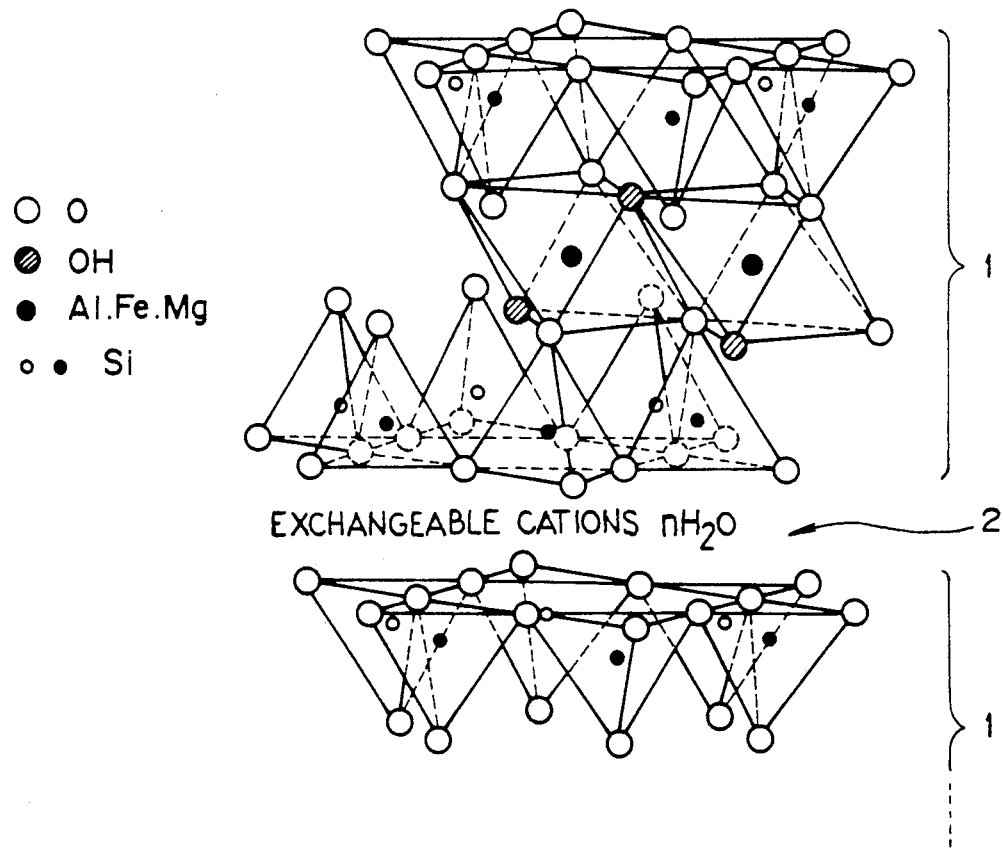
○ O
◉ OH
● Al.Fe.Mg
○ ● Si
EXCHANGEABLE CATIONS nH₂O — 2
FIG. 3
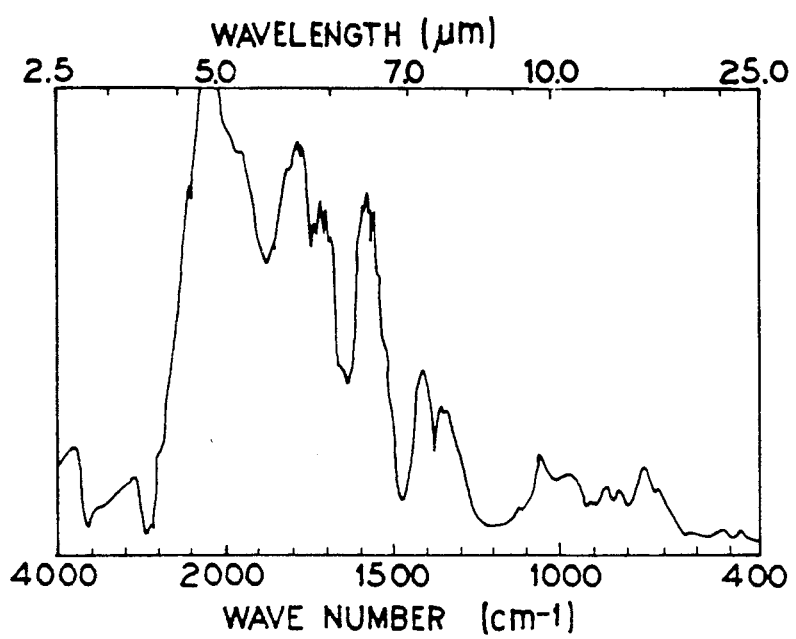

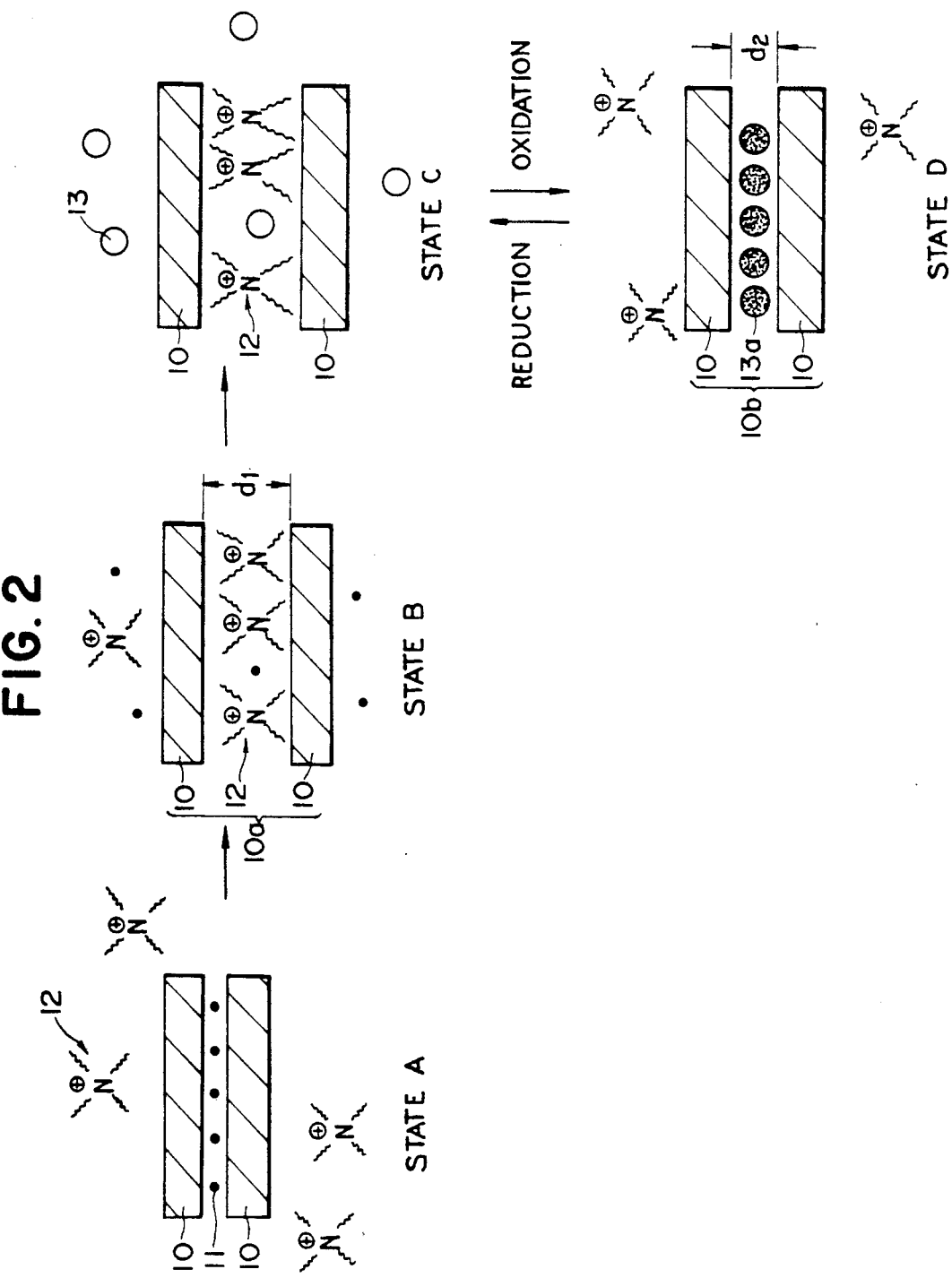

RECORDING MATERIAL WITH A DISPLAY COMPOSITION INCLUDING A COLORING PIGMENT

This is a division of application Ser. No. 07/514,290 filed Apr. 25, 1990.

BACKGROUND OF THE INVENTION

The present invention relates to a display composition which undergoes reversible color development and color fading by oxidation-reduction reaction, to a coloring pigment, and to a recording material made with said display composition. More particularly, the present invention relates to a coloring pigment having good solvent resistance, to a new display composition suitable for electrolytic recording systems, and to an electrolytic recording paper.

A recent advance in the field of information recording is the development of the lactone-type functional dye which develops a color by the aid of an acid catalyst. This dye is based on the modification of the structure of phenolphthalein. It finds use as a component of pressure-sensitive copying paper and heat-sensitive recording paper which are now in practical use. For their production, it is dispersed, together with a color former, into a binder and the resulting composition is applied to a substrate such as paper and polymer film.

Pressure-sensitive copying paper, which is called non-carbon paper, develops a color by the following mechanism. It has microcapsules containing a leuco dye such as crystal violet lactone. As the microcapsules are broken by external pressure, the leuco dye is released. On contact with a solid acid, it forms a color through the ring opening of the lactone ring. Examples of the solid acid include a variety of electron acceptors having a phenolic hydroxyl group and also include clay minerals.

Heat-sensitive recording paper develops a color by the following mechanism. It contains a leuco dye (such as fluoran dye) and a color former (such as bisphenol A). They are brought into contact with each other in the molten state at a specific position which is locally heated by the thermal head according to the information for recording. The contact causes the color former to release protons which open the lactone ring, leading to the color development.

The above-mentioned lactone-type functional dye forms a color based on the principle that the intermolecular contact between a leuco dye (as an electron donor) and a color former or solid acid (as an electron acceptor) oxidizes the leuco dye at the acid centers of the color former, converting it into a type which takes on a color. For this color development to be recognized as letters or images, it is necessary that the leuco dye and color former are kept separate when no recording is made and they are brought into contact with each other by a proper means at the time of recording so that color development takes place locally at the part of contact.

Unfortunately, conventional pressure-sensitive copying paper and heat-sensitive recording paper still have a disadvantage that color development takes place at parts where color should not appear and the color fades away with the lapse of time.

In the case of pressure-sensitive copying paper, the separation between the leuco dye and the solid acid at the time of non-recording is accomplished by the microcapsulation of the leuco dye. Therefore, the production of conventional pressure-sensitive paper necessitates the process for microcapsulation of the leuco dye, which poses a problem associated with low productivity and high production cost. Moreover, microcapsules have another disadvantage that they easily cause unnecessary color development when the copying paper is pressed inadvertently and their recording is not stable completely.

The recording stability is also affected by the performance of the color former, or the intensity of the acidity of the color former. In the case where the color former has a sufficiently high color forming performance and hence the leuco dye takes on the chromophoric structure even without the strong chemical bond with the color former, the contact between the two compounds is likely to disappear, leading to discoloration. This is the reason why considerable discoloration takes place when pressures-sensitive copying paper or heat-sensitive recording paper is left in a hot humid place or brought into contact with an organic solvent which readily dissolves the dye.

Moreover, since conventional pressure-sensitive copying paper and heat-sensitive recording paper are not expected to be used repeatedly, it is very difficult for them to undergo color development and color fading reversibly.

It has been known that the reversible color development and color fading due to pH change is possible with composite clay in which a clay mineral is combined with a dye and a quaternary ammonium ion such that the quaternary ammonium ion is intercalated between the layers of the clay mineral. Devices have been made to improve the color stability by increasing the affinity of the intercalant (quaternary ammonium ion) for the clay mineral. There is disclosed a composite coloring pigment in Japanese Patent Publication No. 8462/1975. It has such a structure that a basic dye having the structure of quaternary ammonium salt is held in zeolite and/or montmorillonite by ion exchange with the exchangeable cation present between the crystal layers of the zeolite an/or montmorillonite. There is also disclosed in Japanese Patent Laid-open No. 35753/1982 a coloring material which undergoes color development and color fading due to pH change. It is formed by introducing a dialkylaminomethyl group into a phthalein indicator, cationizing the indicator (or combining the indictor with a quaternary ammonium ion), and finally causing the cationized indicator to be adsorbed by a clay mineral. Furthermore, there is disclosed in Japanese Patent Laid-open No. 90573/1988 a lipophilic composition of composite coloring pigment, which is formed by the steps of reacting an acid dye with a cation active agent of quaternary ammonium salt type to give a hydrophobic colored complex, and causing the complex to be adsorbed by a water-swelling clay mineral such as montmorillonite. In addition, there is disclosed in Japanese Patent Laid-open No. 256724/1987 an electrically conductive inorganic powder to be used as an antistatic agent, which is formed by causing a compound of quaternary ammonium salt type to be adsorbed by an inorganic powder such as mica and clay.

According to the above-mentioned prior art technology, the quaternary ammonium ion constitutes a part of the molecular structure of the intercalant, or the quaternary ammonium ion in conjunction with the intercalant form the complex. In either cases, the dye and quaternary ammonium ion behave as a whole. It should be pointed out, however, that the prior art technology involves no idea of reversible color development and color fading which take place through the ion exchange between the quaternary ammonium ion and the dye.

OBJECT AND SUMMARY OF THE INVENTION

The present invention was completed to address the above-mentioned problems. Accordingly it is an object of the present invention to provide a highly reliable display composition, a recording material derived from said display composition, and a coloring pigment having good solvent resistance and good fixing performance. The display composition of the present invention is capable of reversible color development and color fading, has good handling properties and productivity, and retains the colored state or discolored state in a stable manner in any environment.

It is another object of the present invention to provide a new display composition which undergoes color development and color fading reversibly through the oxidation-reduction reaction of the dye caused by the electrochemical action or acid/alkali action. The new display composition of the present invention contains both the above-mentioned dye and the clay mineral which has previously been treated with quaternary ammonium ions, so that it has the fixing mechanism in it.

According to the present invention, the display composition exhibits extremely high solvent resistance because it utilizes the coloring pigment in the oxidized state for color development.

It is further another object of the present invention to provide an electrolytic recording paper derived from the display composition, said recording paper keeping the uncolored state for non-recording and keeping the colored state for recording in an extremely stable manner.

BRIEF DESCRIPTION OF THE DRAWINGS

FIG. 1 is a schematic drawing showing the crystalline structure of montmorillonite.

FIG. 2 is a schematic drawing to illustrate the principle of the reversible color development and color fading.

FIG. 3 is an infrared absorption spectrum of a modified clay mineral in which tetra-n-decylammonium ion is intercalated through ionic bonding.

DESCRIPTION OF THE PREFERRED EMBODIMENTS

Figure 4A:
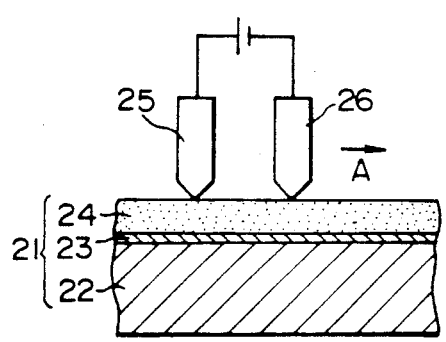
FIGS. 4(A), 4(B), 4(C) and 4(D) are schematic drawings showing the structure of electrolytic recording paper and the apparatus for electrolytic recording paper.

In order to achieve the above-mentioned objects, the present inventors carried out a series of researches, which led to the finding that extremely stable color development takes place in the case of a system composed of a leuco dye and a clay mineral, with its original interlaminar exchangeable cations replaced by quaternary ammonium ions. Such a system behaves differently depending on oxidation and reduction. In the reduced state, the leuco dye does not take on a color even in the presence of a color former; in the oxidized state, the leuco dye takes on a color and undergoes ion exchange with the quaternary ammonium ion, being held between the layers of the clay mineral.

It was also found that the composition in colored state can be used as a coloring pigment and that the composition can be applied to the material layer of electrolytic recording paper which keeps the oxidized state and reduced state in an extremely stable manner owing to the fixing mechanism of the clay mineral. The present invention was completed on the basis of these findings.

The first aspect of the present invention resides in a display composition which comprises a dye and a clay mineral in which quaternary ammonium ions are bound between layers through ion exchange, said display composition undergoing reversible color development and color fading through the oxidation and reduction of said dye, the oxidation causing said dye to form a color and to be bound between the layers of said clay mineral through ion exchange with said quaternary ammonium ions, the reduction causing the dye to discolor and to be desorbed out of the interlaminar space of the clay mineral and also causing the quaternary ammonium ions to be bound again between the layers through ion exchange.

The second aspect of the present invention resides in a coloring pigment which comprises a dye and a clay mineral in which quaternary ammonium ions are bound between layers through ion exchange, said coloring pigment forming a color through the oxidation reaction which causes the colored dye to be bound between the layers of the clay mineral through ion exchange of the quaternary ammonium ions.

The third aspect of the present invention resides in an electrolytic recording paper which comprises a substrate and a material layer formed thereon, said material layer containing a supporting electrolyte, a dye, and a clay mineral in which quaternary ammonium ions are bound between layers through ion exchange, said material layer undergoing oxidation and reduction upon the application of a voltage and the application of a voltage of reverse polarity, respectively, the oxidation causing said dye to form a color and to be bound between the layers of said clay mineral through ion exchange with said quaternary ammonium ions, the reduction causing the dye to discolor and to be desorbed out of the interlaminar space of the clay mineral and also causing the quaternary ammonium ions to be bound again between the layers through ion exchange.

The clay mineral used in the present invention is one which has the laminar structure and exchangeable cations between layers. Typical examples of the clay mineral include montmorillonite minerals.

Montmorillonite minerals are clay minerals of three-layered structure which are represented by the general formula of $(X,Y)_{2-3}Z_4O_{10}(OH)_2 \cdot mH_2O \cdot (R_{1/3})$ (where $X =$ Al, Fe (III), Mn (III), or Cr (III); $Y =$ Mg, Fe (II), Mn (II), Ni, Zn, or Li; $Z =$ Si or Al; $R =$ K, Na, or Ca; $H_2O$ denotes interlaminar water; and m denotes an integer.

They include many different species depending on the combination of X and Y and the number of substituents, such as montmorillonite, magnesian montmorillonite, iron montmorillonite, iron-magnesian montmorillonite, beidelite, aluminian beidelite, nontronite, aluminian nontronite, saponite, aluminian saponite, hectorite, and sauconite. They may be natural products or synthetic products in which the OH group in the above formula is replaced by fluorine.

In addition to the above-mentioned montmorillonite minerals, mica minerals such as sodium silicic mica, sodium taeniolite, and lithium taeniolite can also be used. However, kaolinite, talc, and pyrophyllite are inadequate because they do not have exchangeable ions between layers although they have the layer structure. Moreover, zeolite is of less practical use because it has the reticulate structure and the small pore diameter although it has alkali metal ions or alkaline earth metal ions as the exchangeable cation.

These clay minerals are caused to contain quaternary ammonium ions bound through ion exchange between layers before they are put to use.

The present invention is quite different from the prior art in that the color-forming dye which has been ionized by oxidation is exchanged for the quaternary ammonium ion which has been bound between layers. The dye used in the present invention may also include one which takes on the structure of quaternary ammonium as the result of ionization, and such a dye also undergoes the above-mentioned ion exchange. Therefore, the dye used in the present invention is not limited to acidic compounds as in the case where the dye forms a complex with quaternary ammonium ions.

Incidentally, Japanese Patent Laid-open No. 251490/1988 discloses an electrochromic material which undergoes color development and color fading, with the viologen bound to clay at all times. Unlike the prior art technology, the dye used in the present invention is not necessarily held between the layers of clay mineral at all times but it may be present free outside the interlaminar space. This is advantageous in securing a certain level of electrical conductivity in the layers of the material for the electrochemical oxidation-reduction reaction by means of electrodes.

The quaternary ammonium ion used in the present invention is obtained from quaternary ammonium salts represented by the general formula below.

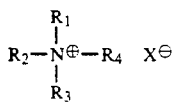

where $R_1$, $R_2$, $R_3$, and $R_4$ are alkyl groups having 4 or more carbon atoms, preferably 8 or more carbon atoms. This carbon number has been chosen in consideration of the molecular size of the leuco dye so as to secure the interlaminar distance of the clay mineral large enough for the suppression of unnecessary color development when no recording is made. The four kinds of the alkyl groups may be different from one another; however, the interlaminar distance is effectively large when they are the same. No restrictions are imposed on the kind of the counter ion $X^{\ominus}$.

The exchange for different cations of the exchangeable cations present between the layers of clay mineral such as montmorillonite is usually accomplished by the addition of a solution or dispersion of a salt containing the different cations to the clay mineral which has previously been swollen with water for the expansion of the interlaminar distance. The expansion of the interlaminar distance is necessary particularly in the case where the different cations for exchange have a comparative large ionic radius. Unfortunately, the above-mentioned quaternary ammonium ions having long alkyl chains, which are highly hydrophobic, are very difficult or impossible to be intercalated between the layers of the clay mineral which has become hydrophilic after swelling with water. An effective countermeasure in this case is electrolysis which is carried out in such a way that the cathode is placed in a dispersion formed by dispersing a clay mineral into an organic solvent containing the quaternary ammonium ions for exchange and the anode is placed in an organic solvent containing the quaternary ammonium ions alone (but not containing the clay mineral). This electrolysis brings about efficient intercalation in the cathode compartment.

No specific restrictions are placed on the amount of the quaternary ammonium ions to be intercalated between the layers of the clay mineral. The upper limit should be established in consideration of the exchangeable capacity, and the lower limit should be established in consideration of the amount necessary to impart the interlaminar distance larger than the diameter of the dye molecule.

The dye used in the present invention is selected from those which undergo color development, color fading, and color change in response to the oxidation-reduction reaction. Typical examples include leuco dyes having a lactone ring, such as triphenylmethanephthalides, fluorans, thiofluorans, indolylphthalides, rhodaminelactams, and azaphthalides.

Triphenylphthalides include crystal violet lactone and malachite green lactone.

Fluorans include 3-diethylamino-6-methyl-7-chlorofluoran, 3-diethylamino-7-methoxyfluoran, 3-diethylamino-6-benzyloxyfluoran, 1,2-benz-6-diethylaminofluoran, 3,6-di-p-toluidino-4,5-dimethylfluoran-phenylhydrazide-$\gamma$-lactam, 3-amino-5-methylfluoran, 2-methyl-3-amino-6-methyl-7-methylfluoran, 2,3-butylene-6-di-n-butylaminofluoran, 3-diethylamino-7-anilinofluoran, 3-diethylamino-7-paratoluidinofluoran, 7-acetoamino-3-diethylaminofluoran, 2-bromo-6-cyclohexylaminofluoran, and 2,7-dichloro-3-methyl-6-n-butylaminofluoran.

Thiofluorans include 3-diethylamino-6-methyl-7-dimethylaminothiofluoran and 3-diethylamino-7-dibenzylaminothiofluoran.

Indolylphthalides include 8-(4-diethylaminophenyl)-8-(1-ethyl-2-methylindol-8-yl)phthalide, 3,3-bis(1-ethyl-2-methyl-8-yl)phthalide, 3,3-bis(2-phenylindol-3-yl)phthalide, 3-(4-di-n-bitylaminophenyl)-3-(2-phenylindol-3-yl)phthalide, and 8-[4-(dimethylamino)-phenyl]-3-[N,N-bis(4-octylphenyl)amino]phthalide.

Rhodaminelactams include rhodamine lactone.

Azaphthalides include 3,3-bis(1-ethyl-2-methylindol-3-yl)-7-azaphthalide.

Additional dyes that can be used in the present invention include leuco basic cyanine, leuco malachite green, leucocrystal violet, p,p'-tetradimethylaminobenzophenone (Michler ketone), oxazine leuco heat-sensitive dye ("CSB-12", a product of Hodogaya Chemical Co., Ltd.), spiropyran leuco heat-sensitive dye ("CSR-13", a product of Hodogaya Chemical Co., Ltd.), quinoline leuco heat-sensitive dye ("CSY-13", a product of Hodogaya Chemical Co., Ltd.), oxidation-reduction indicators, pH indicators, viologen, electron donors such as tetrathiofulvalene (TTF), electron acceptors such as tetracyanoquinodimethane (TCNQ); prussian blue and iridium oxide formed by electrolytic synthesis; polypyrrole, polythiophene, polyaniline, and derivatives thereof which are formed by electrolytic polymerization; and rare earth phthalocyanine and tungsten trioxide formed by vacuum deposition.

The above-mentioned leuco dyes ma be used individually or in combination with one another to give a desired color tone. The amount of the leuco dye to be added is not specifically limited. The upper limit should be such as to give the clay mineral the maximum interlaminar distance. The leuco dye added in excess of the upper limit is not intercalated on account of the saturation between the layers of the clay mineral. On the other hand, the lower limit should be such as to give a sufficient contrast at the time of recording.

The leuco dye used in the present invention may be either hydrophilic or lipophilic; therefore, it may be selected from a broad range of products. However, lipophilic ones are of practical use because an organic solvent is used as a dispersing medium for the intercalation of the quaternary ammonium ions into the interlaminar space of the clay mineral and the interlaminar space of the clay mineral becomes hydrophobic after the intercalation.

The present invention also provides a pigment in the form of dye-clay composite which contains a leuco dye intercalated between layers, with said leuco dye taking on a color by oxidation. A pigment in the form of composite with a clay mineral is known, as disclosed in Japanese Patent Publication No. 8462/1975. The dye to be used for such a composite pigment is limited to water-soluble ones which are capable of direct exchange for exchangeable cations. In other words, lipophilic leuco dyes cannot be used.

The display composition of the present invention is most advantageously applied to electrolytic recording paper for electrolytic recording.

Electrolytic recording is one of the recording systems called electrolytic electrography, which is based on the following principle. Recording is made on an electrolytic recording paper which is composed of a substrate and a material layer formed thereon. The material layer contains a leuco dye and a supporting electrolyte. The application of a voltage to this material layer brings about the electrolysis of the supporting electrolyte, causing an electric current to flow through the material layer. This electric current brings about the color development of the leuco dye through oxidation. The application of a voltage of reverse polarity brings about the color fading of the leuco dye through reduction.

The above-mentioned material layer is prepared by the coating of a substrate with a composition or by the impregnation of a porous substrate with a composition, said composition being composed of a clay mineral, dye, supporting electrolyte, insulating dispersing medium, and optional white powder, said clay mineral containing quaternary ammonium ions (as explained above) bound between layers through ion exchange (this clay mineral will be referred to as modified clay mineral hereinafter), said insulating dispersing medium undergoing solid-liquid change upon heating and cooling.

The supporting electrolyte is added to permit the material layer to keep its electrical conductivity at the locally heated part when the material layer is locally melted by a heating means, thereby to permit the leuco dye to undergo oxidation-reduction reaction rapidly. The compound that can be used as a supporting electrolyte includes the following.

Aliphatic quaternary ammonium salts such as tetrafluoroboric acid tetra-n-butylammonium, perchloric acid tetra-n-butylammonium, cetyltrimethylammonium bromide, and dioctadecyldimethylammonium chloride.

Benzalconium salts such as myristyldiemethylbenzylammonium chloride.

Benzedonium chloride such as benzyldimethyl-[2-[2-(p-1,1,3,3-tetramethylbutylphenoxy)ethoxy]ethyl]ammonium chloride.

Alkylpyridinium salts and imidazolinium salts.

Additional compounds that can be used as the supporting electrolyte include ionic surface active agents such as anionic surface active agents. Examples of the anionic surface active agents include the following.

Carboxylates such as aliphatic soap, sodium palmitate, potassium stearate, and alkyl ether carboxylate.

Sulfonates such as alkylbenzenesulfonate (e.g., sodium laurylbenzenesulfonate), alkylnaphthalenesulfonate (e.g., sodium naphthalenesulfonate), sodium naphthalenesulfonateformalin condensate, and dialkoxysulfosuccinate ester salt.

Sulfate ester salts such as alkyl sulfate, alkylether sulfate, polyoxyethylene-alkylether sulfate, and alkylphenyl-ether sulfate.

Phosphate ester salts such as alkyl phosphate ester salt and alkyl-ether phosphate ester salt.

These ionic surface active agents used as the supporting electrolyte have the possibility of undergoing thermal color development induced by an acid substance. The supporting electrolyte most suitable for practical use is a compound of ammonium salt mentioned above.

The insulating dispersing medium is one which undergoes solid-liquid change upon heating and cooling. The reason why such a insulating dispersing medium is employed is that when the material layer is heated and melted at the time of recording, the supporting electrolyte increases in diffusion constant at the heated part, thereby providing an electric conductivity required for the leuco dye to undergo color development and color fading, although the color development and color fading by electrolytic recording depend essentially on the electrochemical oxidation-reduction reaction. Examples of the insulating dispersing medium include polyethylene, polyacrylate, polymethacrylate, and polyacrylamide, which may be in the form of homopolymer or copolymer. Preferred examples are those polymers which have long alkyl groups in the side chains. Additional examples include liquid-crystalline polymers such as cyanobiphenyl polymer, copolymer of cyanophenyl benzoate and methoxybiphenyl benzoate, and phenyl benzoate-azomethine polymer, and azomethine polymer. The insulating dispersing medium is not necessarily required in the case where the supporting electrolyte itself undergoes the solid-liquid change.

The white powder is optionally added to prevent the recording material from sticking to the printing electrode, to prevent the printing electrode from shorting, to prevent the material layer from deformation, and to increase the apparent contrast, thereby improving the visibility. The white powder may be selected from a broad range of inorganic and organic compounds. The selection should be made with knowledge that it does not function as a color former for the lactone-type leuco dye present with it, (in other words, it does not function as a Brønsted acid (proton donor) nor does it function as a Lewis acid (electron acceptor) for the lactone-type leuco dye).

The modified clay mineral, leuco dye, supporting electrolyte, and insulating dispersing medium mentioned above are mixed to form a composition, which is subsequently applied to a substrate (by coating or impregnation) to form electrolytic recording paper. The substrate may be paper, synthetic paper, plastics film, or a porous material. The resulting electrolytic recording paper may be provided with an auxiliary conductive layer and protective layer.

The thus prepared electrolytic recording paper produces recording upon simultaneous application of heat and electric current. The heat applied liquefies or softens the material layer, and the electric current applied through electrodes induces the oxidation-reduction reaction of the leuco dye, thereby bringing about color development and color fading.

The combination of the heating means and energizing means may be achieved by any one of the following three systems. The first system is made up of a means to apply an electric current to a part for recording and a thermal head (or any other apparatus to generate laser light or Joule heat) for local heating. (Local heating with laser light through light-heat conversion may be accomplished with a high energy conversion efficiency if the material layer is incorporated with a sensitizing dye.) The second system performs recording by heating a recording part and locally applying an electric current. The recorded information is fixed when the heating is suspended after recording and the material layer solidifies. The third system is based on the combination of local heating and local energizing. No matter what the system is, any desired tone can be obtained by controlling the amount of electric current applied.

There are several possible types of electrolytic recording paper according to the recording system mentioned above. The structure of electrolytic recording paper will be explained with reference to FIGS. 4(A) to 4(D). It is assumed that this electrolytic recording paper is used for a system which heats the recording part and locally applies an electric current through a head. Heating is accomplished by keeping constant the temperature of the energizing head or the roller to pass the electrolytic recording paper.

Figure 4B:
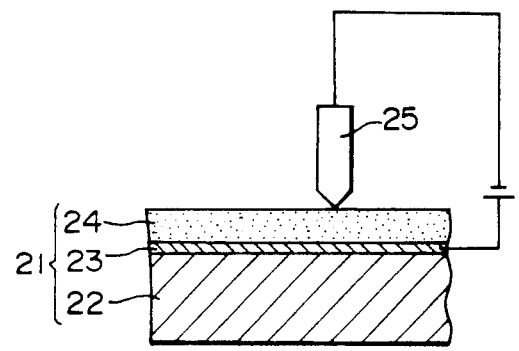

FIGS. 4(A) and 4(B) show an electrolytic recording paper (21) which is composed of a substrate (22), an electrically conductive layer (23), and a material layer (24) laminated on top of the other. The electrically conductive layer (23) is formed by vacuum deposition of aluminum. The material layer (24) is formed by coating the substrate with a composition composed of a modified clay mineral, leuco dye, and binder dispersed into a solvent. The system shown in FIG. 4(A) is constructed such that the head (25) and the counter electrode (26) slide together on the surface of the material layer (24) in the direction (A) of arrow (or the electrolytic paper (21) runs). By contrast, the system shown in FIG. 4(B) is constructed such that the head (25) alone slides and the electrically conductive layer (23) functions as the counter electrode. In either systems, a part of the material layer (24) having a certain resistance constitutes the passage of electric current, and the latter system is desirable from the standpoint of recording sensitivity, because the passage of electric current is shorter in the latter system than in the former system. Moreover, the latter system is not liable to shorting. A disadvantage of the electrolytic recording paper in which the electrically conductive layer (23) is formed under the material layer (24) is that the color of the electrically conductive layer (23) is visible through the material layer (24) and this lowers the whiteness of the recording paper. This disadvantage is eliminated in the present invention because the material layer (24) contains a clay mineral having a high hiding power. Therefore, the recording paper has a high degree of whiteness and a high degree of apparent contrast ratio.

Figure 4C:
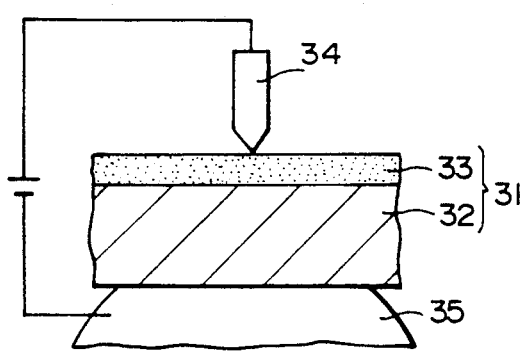

FIG. 4(C) shows an electrolytic recording paper (31) which is composed of an electrically conductive substrate (32) and a material layer (33) formed thereon. (The material layer (33) is the same as that mentioned above.) The surface of the material layer (33) is in contact with the head (34), and the surface of the electrically conductive substrate (32) is in contact with the counter electrode (35). The head (34) and counter electrode (35) are connected to form a closed circuit. The system as shown in FIG. 4(C) obviates the necessity of forming the electrically conductive layer by vacuum deposition or the like. This simplifies the production of recording paper and eliminates shorts between electrodes.

Figure 4D:
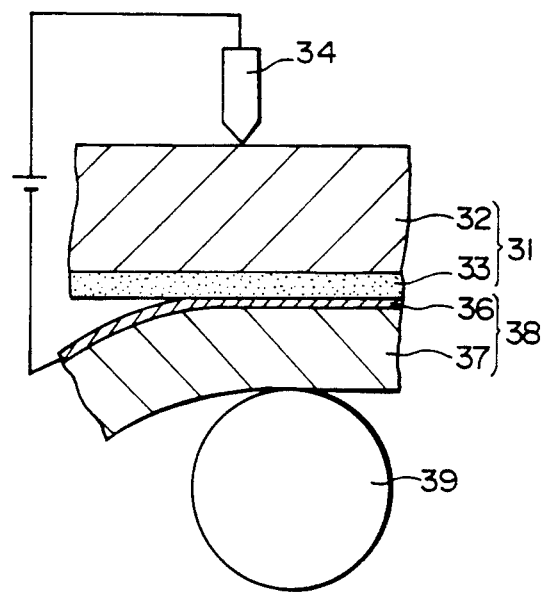

FIG. 4(D) shows another system which was made available by the use of an electrically conductive substrate. In this system, the counter electrode is an aluminum deposit layer (36) formed on a polyethylene terephthalate (PET) film (37). At the time of recording, the aluminum-deposited PET film (38) and the electrolytic recording paper (31) are run together under pressure against the insulated roller (39), with the aluminum deposite layer (36) and the material layer (33) facing each other. The head (34) is in contact with the electrically conductive substrate (32) of the electrolytic recording paper (31), so that a predetermined potential is applied across the head (34) and the aluminum deposite layer (36). Recording is accomplished by the selective application of voltage. After recording, the aluminum-deposited PET film (38) is separated from the electrolytic recording paper (31). An advantage of this system is that the material layer (33) is not in direct contact with the head and hence is protected against scratches.

The electrolytic recording paper (31) shown in FIGS. (C) and 4(D) has the electrically conductive substrate (32) which is formed by imparting electrical conductivity to a substrate. For example, it may be paper made from pulp slurry incorporated with white conductive particles or carbon powder. It may also be produced in a simple manner by the impregnation of paper, synthetic paper, or other porous substrate with an electrolyte such as quaternary ammonium salt. The electrolyte for this purpose should be one which does not split the dye-clay mineral composite (coloring pigment) upon contact (or does not interfere with the fixing of the dye). The presence or absence of interference is easily confirmed by immersing the leuco-clay mineral composite in the electrolyte for a certain period of time and then observing whether the dye is liberated in the electrolyte or the color of the leuco-clay mineral composite fades away. A preferred electrolyte is one which undergoes solid-liquid change in the same manner as the material layer. Such an electrolyte becomes solid and scatters light when no recording is made. This contributes to keeping the whiteness required for recording paper.

The material layer of the electrolytic recording paper should be composed of 1 part by weight of leuco dye, $100^{-3}$ to $10^{10}$ parts by weight of modified clay mineral, and $10^{-3}$ to $10^{10}$ parts by weight of supporting electrolyte. If necessary, a resin binder and plasticizer may be added in an amount up to $10^{10}$ parts by weight.

Another possible type of recording paper may be formed by impregnating a porous substrate with a composition instead of forming the material layer. This type of recording paper, however, has some drawbacks. For example, the porous substrate should have a pore diameter larger than the particle diameter of the clay mineral: the clay mineral might completely fill the pores in the porous substrate, decreasing the whiteness (or increasing the clarity) of the display material; and the layer for recording tends to be too thick to produce sharp images. For these reasons, the structure shown in FIGS. 4(A) to 4(D) is desirable in the present invention.

The electrolytic recording paper mentioned above is superior to conventional heat-sensitive recording paper in that it is inherently free from fogging and color fading. Conventional recording paper is liable to unwanted color development during production or during storage after recording, because it has a leuco dye and a color former (a solid acid having a phenolic hydroxyl group) which easily come into contact with each other in the material layer. By contrast, the electrolytic recording paper does not need any solid acid having a phenolic hydroxyl group, because the color development in the electrolytic recording paper takes place electrochemically. It may be said that the material layer of the electrolytic recording paper contains a leuco dye and a color former together because the clay mineral is one kind of solid acid. In this case, however, the clay mineral does not function as a color former for the leuco dye but it helps fixation of the leuco dye after its color development. The clay mineral existing together with the leuco dye does not cause color development, because the acid center of the clay mineral is blocked by the quaternary ammonium ion when no recording is made.

The electrolytic recording paper has been explained above; and the present invention may also be applied to pressure-sensitive copying paper, which is composed of two sheets of paper, color-forming paper and upper paper. The color forming paper is formed by coating a substrate with a composition containing the modified clay mineral and leuco dye and a solvent for dispersion. The upper paper is formed by coating a substrate with microcapsules containing a solution of free acid (e.g., HCl) or solid acid in an organic solvent. The color-forming paper and the upper paper are placed on top of the other, with the color-forming layer and microcapsule layer facing each other. When the upper paper or color-forming paper is subjected to writing pressure, microcapsules are locally broken and the color former is released from the microcapsules. The color former subsequently moves to the color-forming layer, causing the leuco dye to develop a color through oxidation. At the same time, the color former undergoes ion exchange for the quaternary ammonium ion present in the interlaminar space of the modified clay mineral, and this ion exchange forms the dye-clay mineral composite. The thus formed dye-clay mineral composite has good solvent resistance and retains its color. In this way it is possible to improve the fixing in the pressure-sensitive recording paper.

The solid acid that can be used for the above-mentioned object include a variety of electron acceptor compounds, whose examples are listed below. tert-butylphenol, nonylphenyl, dodecylphenol, styrenized phenols, 2,2-methylenebis-(4-methyl-6-tert-butylphenol), α-naphthol, β-naphthol, hydroquinone monomethyl ether, guaiacol, eugenol, p-chlorophenol, p-bromophenol, o-chlorophenol, o-bromophenol, p-phenylphenol, o-phenylphenol, p-(p-chlophenyl)-phenol, o-(o-chlorophenyl)phenol, methyl p-oxybenzoate, ethyl p-oxybenzoate, propyl p-oxybenzoate, butyl p-oxybenzoate, octyl p-oxybenzoate, dodecyl p-oxybenzoate, 3-isopropylcatechol, p-tert-butylcatechol, 4,4-methylenediphenol, 4,4-thio-bis-(6-tert-butyl-3-methylphenol), 1,1-bis-(4-hydroxyphenyl)siloxane, 4,4-butylidene-bis-(6-tert-butyl-3-methylphenol), bisphenol A, bisphenol S, 1,2-dioxynaphthalene, 2,3-dioxynaphthalene, chlorocatechol, bromocatechol, 2,4-dihydroxybenzophenone, phenolphthalein, o-cresolphthalein, methyl protocatechuate, ethyl protocatechuate, propyl protocatechuate, octyl protocatechuate, dodecyl protocatechuate, 2,6-trioxymethylbenzene, 2,3,4-trioxyethylbenzene, methyl gallate, ethyl gallate, propyl gallate, butyl gallate, hexyl gallate, dodecyl gallate, cetyl gallate, stearyl gallate, and 2,3,5-trioxynaphthalene, and tannic acid.

The solvent used to form the color-forming layer is selected from good solvents for the leuco dye. A preferred example is acetone, which dissolves the leuco dye well and also swells the modified clay mineral well. The solvent should preferably be completely free of acids, so that the color-forming paper is protected from fogging (which is a phenomenon of the color-forming paper developing a color slightly and uniformly when no recording is made). An acid-free solvent can be obtained by electrolysis of a solution containing a quaternary ammonium ion in an H-cell. After electrolysis, the solution at the cathode should be collected.

The composition that forms the color-forming layer of the color-forming paper should be composed of 1 part by weight of leuco dye, $10^{-1}$ to $10^6$ parts by weight of modified clay mineral, and 1 to $10^6$ parts by weight of solvent. On the other hand, the microcapsules on the upper paper should contain an acid with a concentration higher than $10^{-5}$ N.

The color-forming layer may also be formed by coating a substrate with a composition which contains a leuco dye-clay mineral composite and a binder (such as polyvinyl alcohol). The leuco dye-clay mineral composite is formed from a clay mineral and leuco dye dispersed in a good solvent for the leuco dye. When this dispersion is mixed with a large amount of water (which is a poor solvent for the leuco dye), the leuco dye is intercalated between the layers of the clay mineral due to the difference in distribution coefficient.

In this case, the composition to form the color-forming layer should be composed of 1 part by weight of modified clay mineral, $10^{-4}$ to $10^2$ parts by weight of binder, and $10^{-4}$ to $10^2$ parts by weight of poor solvent. On the other hand, the microcapsules on the upper paper should contain an acid with a concentration higher than $10^{-5}$ N.

Incidentally, the pressure-sensitive copying paper pertaining to the present invention does not necessarily require that the acid as the color former should be enclosed in microcapsules. In this case, the structure of the color-forming paper and upper paper is different from that of the above-mentioned pressure-sensitive copying paper. The color-forming paper may be formed by coating a substrate with a color-forming layer containing a solid acid such as phenolic resin, and the upper paper may be formed by coating a substrate with a layer of microcapsules. The microcapsules are formed from a composition containing the modified clay mineral and leuco dye dispersed in a solvent.

Moreover, the present invention may also be applied to heat-sensitive recording paper. The heat-sensitive recording is accomplished on the principle that when the material layer on the heat-sensitive recording paper is selectively heated and melted, the leuco dye and solid acid contained in the heated part of the material layer come into contact with each other on the molecular level, forming a color. In the case of the heat-sensitive recording paper pertaining to the present invention, the material layer contains a modified clay mineral, leuco dye, solid acid, and binder. (The binder functions to fix the material layer onto the substrate.) The leuco dye and solid acid may be selected from the above-mentioned substances.

The composition to form the material layer should contain 1 part by weight of leuco dye, $10^{-3}$ to $10^{10}$ parts by weight of modified clay mineral, $10^{-2}$ to $10^5$ parts by weight of solid acid, and $10^{-4}$ to $10^3$ parts by weight of binder.

In the meantime, a disadvantage of conventional heat-sensitive recording paper is that the fixing of the dye is incomplete and the color fades away considerably upon contact with water or esters. This disadvantage has been eliminated by the heat-sensitive recording paper of the present invention which retains the color with an extreme stability in any environment, because the material layer contains the modified clay mineral which functions as a color-fixing means.

FUNCTION OF THE INVENTION

According to the present invention, color development does not take place when no recording is made, despite the coexistence of a color former (clay mineral) and a leuco dye, and the dye is fixed in an extremely stable manner when recording is made. This outstanding performance is ascribed to the combination of the color development and color fading of the leuco dye induced by oxidation-reduction reaction and the ion-exchange action of the clay mineral which has adsorbed quaternary ammonium ions.

The typical example of the clay mineral used in the present invention is montmorillonite. It is composed of repeating units (1) of three-layered structure whose basic skeleton is a regular octahedron, as shown in FIG. 1. In the interlaminar space (2) between the repeating units (1) of three-layered structure are held alkali metal ions (exchangeable cations) and n molecules of intercalated water. The distance of the interlaminar space (2) is increased or decreased in proportion to the ionic radius of the intercalant.

FIG. 2 shows how color development and color fading take place when exchangeable cations are bound through ion exchange for quaternary ammonium ions and the leuco dye is added. The structure of montmorillonite is schematically shown.

State-A shows montmorillonite (10) holding exchangeable cations (11) between layers, which is dispersed into a solvent together with quaternary ammonium ions (12) having long alkyl side chains. The solvent is a good solvent for quaternary ammonium ions and hence it is highly hydrophobic in general. Therefore, the montmorillonite does not swell and ion exchange does not take place unless something is done. If this dispersion undergoes electrolysis in the cathode side, the quaternary ammonium ions (12) are intercalated between layers and the interlaminar space cf montmorillonite (10) expands, as indicated by State-B. Thus there is obtained the modified clay mineral (10a). The modified clay mineral (10a) has an interlaminar distance ($d_1$) larger than the ionic radius of the leuco dye (13) mentioned later. On the interlaminar surfaces of the montmorillonite (10) are negative charges which are the acid centers for the color development of the leuco dye. It is considered that the negative charges are mostly cancelled by the positive charges of the quaternary ammonium ions.

In the subsequent step, the modified clay mineral (10a) is recovered from the dispersion indicated by State-B, and then dispersed into a new solvent and the leuco dye (13) is added to the dispersion, as indicated by State-C. This leuco dye (13) is of such a type that the color fades away upon reduction. The leuco dye (13) added to the dispersion is partly intercalated between the layers of the modified clay mineral (10a); however, it does not change into such a type that the color forms upon oxidation, because the acid centers of montmorillonite (10) having the color-forming function are blocked by the quaternary ammonium ions (12) and the interlaminar distance is much larger than the ionic radius of the leuco dye (13). In addition, the leuco dye (13) is not replaced by the quaternary ammonium ions (12) through ion exchange, because the leuco dye (13) itself is not ionized when it is in the reduced state. Thus there is obtained an extremely unique dispersion which does not form any color despite the coexistence of the leuco dye and color former.

When this dispersion is oxidized electrochemically in the anode side or oxidized by the addition of a free acid or the contact with a solid acid, the leuco dye (13) becomes oxidized and ionized and changes into a color-forming dye (13a), as indicated by State-D. This color-forming dye (13a) is intercalated between the layers of the modified clay mineral (10a), with the result that the quaternary ammonium ions (12) are expelled by competitive adsorption.

Thus the color-forming dye (13a) and the clay mineral (10) forms a color-clay composite (10b) in which the color-forming dye (13a) is bound between the layers of the clay mineral (10) through ion exchange. This color-clay composite (10b) has the interlaminar distance ($d_2$) which is smaller than the interlaminar distance ($d_1$) which exists when the quaternary ammonium ions (12) are held. This is the reason why the color formation is kept in a very good state according to the present invention. It should be pointed out that the color formation is accomplished by the electrochemical oxidation or the addition of an acid, and the dye which has formed a color in this manner is held between the layers of the clay mineral which has acid centers. It is this mechanism which keeps the colored state of dye stable (or fixed). Upon separation from the dispersion, there is obtained the dye-clay composite (10b) which is a coloring pigment having an extremely good solvent resistance.

When the dispersion indicated by State-D is electrochemically reduced in the cathode side, the dispersion returns to State-C. In this way, the reversible color development and color fading are achieved by oxidation-reduction reaction.

The foregoing is the principle of reversible color development and color fading. The principle can be applied to various recording systems such as electrolytic recording, pressure-sensitive copying, and heat-sensitive recording, in which the solvent for the dispersion may be replaced by a supporting electrolyte or insulating dispersing medium, the acid as a color former may be replaced by a solid acid, or the acid may be separated from the dye-clay composited. No matter what the recording system is, the most important feature of the present invention is the fact that the leuco dye is free when in the reduced state and is held between the layers of the clay mineral through ion exchange for quaternary ammonium ions when in the oxidized state. Owing to the feature, the present invention provides a recording material having greatly improved sensitivity, resolution, gradation, and fixation.

EXAMPLES

The preferred embodiments of the present invention will be explained with reference to the following experimental examples.

EXPERIMENTAL EXAMPLE 1

This and following experimental examples are intended to demonstrate the principle of color development and color fading.

This experimental example was carried out to give a composite of quaternary ammonium ion and clay mineral (modified clay mineral) by the process which consists of dispersing montmorillonite and leuco dye into a dispersing medium, recovering a dye-clay composite directly from the dispersion, and subjecting the dye-clay composite to electrolysis in the presence of quaternary ammonium ions, instead of ion exchange for the quaternary ammonium ions.

In the first step, 0.8 g of a black-forming leuco dye ("CF51" made by Hodogaya Chemical Co., Ltd.) was dissolved in 30 g of acetone. Into this solution was ultrasonically dispersed montmorillonite (reagent grade, made by Bansei Kagaku Co., Ltd.). To the dispersion was added 1.7 g of 60% aqueous solution of perchloric acid so that the leuco dye forms a black color. It was noticed that the montmorillonite was not swollen by acetone and the leuco dye formed a black color in the liquid phase of the black dispersion.

Subsequently, water was slowly added to the black dispersion with stirring until the total volume reached about 1 liter. Upon standing, this black dispersion formed greenish black precipitates. The precipitates were filtered off and washed with a large amount of water, ethanol, and acetone consecutively, followed by drying under reduced pressure. Thus there were obtained blackish purple particles.

The colored particles were found to have an interplaner spacing (001) or an interlaminar distance of 16.35 Å by powder X-ray diffractometry. It should be noted that this interplaner spacing is greater by 6.58 Å than the interplaner spacing (9.77 Å) of the original montmorillonite. This suggests that the colored particles are a dye-clay composite in which the leuco dye is intercalated between the layers of montmorillonite. This phenomenon may be attributable to the swelling of montmorillonite which occurred when a large amount of water was added to the black dispersion in acetone and the subsequent bonding of the leuco dye through ion exchange for the exchangeable cations which montmorillonite inherently possesses.

The above-mentioned dye-clay composite is insoluble in general-purpose organic solvents, and behaved like an extremely stable pigment without fading even when left in the solvent.

The dye-clay composite (0.5 g) was placed in one of the electrode compartments of an H-shaped electrolytic cell. To that compartment was added an acetone solution composed of 25 g of acetone and 0.25 g of perchloric acid tetra-n-decylammonium as an electrolyte. To the other electrode compartment was added the acetone solution alone. Into the both electrode compartments were inserted electrodes of SUS plate (20 mm wide, 40 mm long, and 0.1 mm thick). Electrolysis was carried out at a constant voltage of 2 V regulated by a potentiostat, under air saturation, with the cathode being the compartment containing the dye-clay composite. During electrolysis, the dispersion in the cathode compartment was stirred. After electrolysis for about 20 hours, the dispersion in the cathode compartment was completely discolored. From this dispersion was recovered white powder by decantation with acetone. The white powder was washed with a large amount of acetone and dried under reduced pressure.

According to powder X-ray diffractometry, the white powder has an interplaner spacing (001) of 25.97 Å. It should be noted that this interplaner spacing is greater by 16.2 Å than the interplaner spacing of the original montmorillonite. This white powder gave an infrared absorption spectrum as shown in FIG. 3. It is noted that there is no absorption peak which suggests the presence of the leuco dye but there is an absorption peak which is attributable to the long-chain alkyl group contained in the tetra-n-decylammonium ion. It is thought that this white powder is the modified clay mineral in which tetra-n-decylammonium ions are intercalated between the layers of montmorillonite. This phenomenon may be elucidated as follows: When the dispersion containing the dye-clay composite is electrolyzed in the presence of tetra-n-decylammonium ions in the cathode compartment of an H-shaped electrolytic cell, the dye taking on a color loses its color by reduction and returns to the leuco dye. At the same time, the tetra-n-decylammonium ions are bound between the layers of montmorillonite through ion exchange.

EXPERIMENTAL EXAMPLE 2

This experimental example was carried out to compare the white powder (modified clay mineral) obtained in Experimental Example 1 with untreated montmorillonite for the ability to fix the dye.

First, 0.4 g of the white powder was ultrasonically or mechanically dispersed into 8 g of acetone. To the dispersion was added 0.032 g of the above-mentioned leuco dye ("CF51" made by Hodogaya Chemical Co., Ltd.). The white powder was not colored and the dispersion remained white as a whole. The dispersion remained unchanged even after standing for 24 hours. (The white powder did not settle nor did it become colored.)

Secondly, to the dispersion was added 0.024 g of 60% aqueous solution of perchloric acid. Greenish black particles were formed immediately. They settled or agglomerated, but the supernatant liquid was almost clear.

The greenish black particles were recovered and washed with a large amount of acetone. Discoloration was hardly noticed. The greenish black particles were found to have an interlaminar distance of 19.80 Å by powder X-ray diffractometry. It should be noted that this interlaminar distance is greater by 10.03 Å than that of the original montmorillonite. On the other hand, from the supernatant liquid were separated white crystals which are insoluble in water and have a melting point of 125° C. Analytical data indicate that the white crystals are perchloric acid tetra-n-decylammonium.

As in the case of the dye-clay composite obtained in Experimental Example 1 mentioned above, the greenish black particles were insoluble in water and general-purpose organic solvents and behaved like an extremely stable pigment. In fact, the greenish black particles showed almost no sign of discoloration even after immersion in excess acetone for 4 months at room temperature.

This phenomenon may be elucidated as follows: The leuco dye becomes oxidized and changes into the color-assuming dye when an acid is added. This color-assuming dye undergoes ion exchange for a large portion of tetra-n-decylammonium ion which has been intercalated between the layers of the modified clay mineral. As the result, the dye-clay composite is formed again and the dye is stably fixed.

For comparison, the same experiment as mentioned above wa carried out except that the modified clay mineral was replaced by untreated montmorillonite. A remarkable difference was noticed in behavior.

Untreated montmorillonite was dispersed into acetone, and to the resulting dispersion was added the leuco dye. The montmorillonite particles immediately took on a grayish black color and settled. When a solution of perchloric acid was added to the dispersion, the dispersion as a whole took on a color. The supernatant liquid remained colored even after the grayish black particles had bee filtered off.

The above-mentioned results suggest that untreated montmorillonite takes on a color immediately upon the addition of the leuco dye because there are exposed acid centers for color forming in the interlaminar space of untreated montmorillonite. However, untreated montmorillonite is weak in fixing power and the color-assuming dye mostly remains in the liquid phase. In fact, the grayish black particles discolored almost completely within one day when left in excess acetone at room temperature.

EXPERIMENTAL EXAMPLE 3

The above-mentioned experiments proved the marked ability of the modified clay mineral to fix the dye. Therefore, this experimental example was carried out to investigate the simple method of preparing the modified clay mineral. In Experimental Example 1, a complex process was employed for electrolytic reduction after the preparation of the dye-clay composite. In this Experimental Example 3, the modified clay mineral was obtained by protonizing untreated montmorillonite.

First, 20 g of montmorillonite was dispersed in 1 liter of water for swelling. To the dispersion was slowly added dropwise with stirring 2.12 g (20 mg equivalent) of 35% aqueous solution of hydrochloric acid. The dispersion increased in viscosity. Particles taken from this dispersion were found to be protonized montmorillonite in which original sodium ions present between layers are replaced by protons through ion exchange. The interlaminar distance was 13.6 Å.

Secondly, to the dispersion was added 800 mL of ethanol and then added dropwise 13.2 g (20 mg equivalent) of tetra-n-decylammonium bromide dissolved in ethanol. The particles agglomerated and settled. In this dispersion was dissolved 10 g of sodium hydroxide, followed by standing for 2 days at room temperature.

Thirdly, the precipitates were filtered off from the dispersion and then washed with a large amount of ethanol so that tetra-n-decylammonium ions which are not intercalated between layers were removed. The precipitates were washed further with a large amount of water until the filtrate was neutral, so that sodium hydroxide was removed. The precipitates were dried at 60° C. under reduced pressure. Thus there was obtained a grayish white powder.

This grayish white powder was found to have an interlaminar distance of 27.7 Å. It did not take on any color at all when it was dispersed into acetone and the leuco dye ("CF51" made by Hodogaya Chemical Co., Ltd.) was added to the dispersion. However, when hydrochloric acid was added to the dispersion, the grayish white powder immediately took on a color and changed into a pigment-like powder.

For comparison, a modified clay mineral was prepared directly from untreated montmorillonite without the protonizing treatment in the following manner. First, montmorillonite was dispersed into water for swelling, and then tetra-n-decylammonium bromide dissolved in ethanol was added. The resulting precipitates were recovered. The precipitates were found to have an interlaminar distance which is smaller by 4–5 Å than that of the above-mentioned grayish white powder. The precipitates assumed a reddish purple color when brought into contact with the leuco dye in acetone.

These results may be elucidated as follows: The protonizing treatment gives rise to a modified clay mineral in which tetra-n-decylammonium ions are held between layers by ionic bond. This modified clay mineral does not cause the leuco dye to assume a color even when it coexists with the leuco dye, because it holds a large amount of tetra-n-decyl ammonium ions which cancels the acid centers and it has a sufficient interlaminar distance. However, the modified clay mineral prepared without the protonizing treatment does not hold tetra-n-decylammonium ion completely between layers and has a smaller interlaminar distance. Therefore, it cause the leuco dye to assume a color when it coexists with the leuco dye. The reason for the incomplete holding is that the interlaminar space of water-swollen montmorillonite is hydrophilic and it is difficult for large ions having hydrophobic long-chain alkyl groups to enter the hydrophilic interlaminar space. A modified clay mineral like this will cause fogging when applied to a variety of recording paper mentioned later.

EXPERIMENTAL EXAMPLE 4

The comparative experiment in Experimental Example 3 revealed that quaternary ammonium ions do not always enter the interlaminar space of a water-swollen clay mineral efficiently. This Experimental Example 4 was carried out to investigate the method of causing quaternary ammonium ions to enter a clay mineral which is not previously swollen.

First, 2 g of protonized montmorillonite powder (mentioned above) was placed in one electrode compartment of an H-shaped electrolytic cell. To the compartment was added a solution composed of 43 g of acetone and 3 g of perchloric acid tetra-n-decylammonium to form a dispersion. This dispersion was kept stirred because the protonized montmorillonite does not swell with acetone. To the other electrode compartment was added the above-mentioned acetone solution alone. Into the both electrode compartments were inserted electrodes of SUS plate. Electrolysis was carried out for 6 hours at a constant voltage of 2 V regulated by a potentiostat, under air saturation, with the cathode being the compartment containing the protonized montmorillonite. The current value decreased from 12 mA to 6 mA with the lapse of time. This suggests the consumption of the electrolyte (tetra-n-decylammonium ion). The powder in the cathode compartment swelled with the lapse of time, with the result that the dispersion eventually lost its fluidity.

From the dispersion in the cathode compartment was recovered precipitates by repeated decantation with acetone. The precipitates were dried at 60° C. under reduced pressure. Thus there was obtained a grayish white powder. This grayish white powder was found to have an interlaminar distance of 25.2 Å, which is greater by 11.6 Å than that of the protonized montmorillonite. An infrared absorption spectrum obtained by the diffusion reflectance method has an absorption peak attributable to the methylene chain. This indicates that tetra-n-decylammonium ions are intercalated between layers.

For comparison, the same dispersion as placed in the cathode compartment was simply stirred at room temperature for 72 hours without electrolysis. The particles immediately settled, without swelling, as soon as stirring was suspended. The resulting particles were found to have an interlaminar distance which is slightly larger than that of the protonized montmorillonite. X-ray diffractometry simply gave broad peaks.

The above-mentioned results suggest that electrolysis is effective for the introduction of tetra-n-decylammonium ions into a clay mineral which is not previously swollen.

Incidentally, the exchangeable cations contained between the layers of montmorillonite are inorganic ions (such as proton, $Na^+$, $Ca^{2+}$, and $Mg^{2+}$) as well as organic cations. In the case where the organic cation is fluoran dye ion, the clay mineral containing it between layers assumes a unique color. When this fluoran dye ion is reduced for color fading, it loses its ionic properties. As the result, tetra-n-decylammonium ion gets into the interlaminar space. This is utilized to visually confirm the end point of ion exchange reaction.

EXPERIMENTAL EXAMPLE 5

This experimental example was carried out to apply the display composition of the present invention to the material layer of electrolytic recording paper.

The material layer is formed by coating a substrate with a coating solution composed of a modified clay mineral, leuco dye, supporting electrolyte, insulating dispersing medium, plasticizer, and solvent. The solvent for the coating solution was completely freed of acids in the following manner to prevent fogging that otherwise would occur before recording.

In an H-shaped electrolytic cell was placed a solution composed of 37 g of acetone, 2 g of water, and 1 g of perchloric acid tetra-n-decyl ammonium (as supporting electrolyte). Electrode of SUS plates were inserted into the two electrode compartments. Electrolysis was carried out for 30 minutes at a constant voltage of 2 V. During the period of electrolysis, the initial current value of 7 mA was maintained. This electrolysis evolved an acid in the anode side and an alkali in the cathode side, which was confirmed by means of pH test paper.

The solution obtained from the cathode side was used to prepare the coating solution according to the following formulation.

| | |
|---|---|
| Solution in cathode side (containing supporting electrolyte) | 300 pbw |
| Modified clay mineral | 8 pbw |
| Leuco dye ("CF51" made by Hodogaya Chemical Co., Ltd.) | 1 pbw |
| -continued | |
| Polyester resin (insulating dispersing medium ("Bylon 500" made by Toyobo Co., Ltd. | 5 pbw |
| Ethylene carbonate (plasticizer) | 15 pbw |

The modified clay mineral shown in the above formulation is one which was prepared by the protonizing treatment in Experimental Example 3 mentioned above. The above-mentioned components were ultrasonically dispersed. There was obtained a viscous coating solution in which the modified clay mineral was swollen. This coating solution was applied onto the aluminum deposite layer formed on polyethylene terephthalate (PET) film. (The aluminum deposite layer functions as an electrically conductive layer.) The coating thickness was adjusted using a doctor knife so that the wet coating thickness was 200 μm. The coating layer was dried with hot air (150° C.). The dried coating layer, which was slightly yellowish, functions as the recording layer on the electrolytic recording paper.

Although the thus formed recording layer has a high degree of whiteness for practical use, it may be incorporated with white particles (such as barium sulfate and zinc oxide) having a high hiding power to improve the whiteness. The amount of the white particles is 5-80 parts by weight for 100 parts by weight of the recording layer. However, the white particles should be those which do not function as an acid which induces the color development of the leuco dye. If necessary, they should be used after washing, surface treatment with an alkali, ion adsorption treatment with inorganic or organic salt, or treatment with a nonionic or cationic surface active agent.

The electrolytic recording paper was used for image recording by the scanning of a copper head arranged as shown in FIG. 4(A) or FIG. 4(B). Recording was carried out under the following conditions. Applied voltage: 40 V, head scanning speed: 10 mm/sec, and head temperature: 100° C. As the result of recording, that part of the recording paper to which a voltage was applied turned into a dark greenish black color.

The mechanism of color development in the electrolytic recording paper is explained below. The head locally heats the material layer at its contact point. This heating melts the insulating dispersing medium contained in the material layer. The insulating dispersing medium in the molten state increases in ion conductivity. Under this condition, the head selectively applies an electric current, which brings about electrochemical oxidation reaction, resulting in the color development of the leuco dye. The leuco dye is caught between the layers of the modified clay mineral.

By contrast, that part of the material layer to which no voltage was applied remained unchanged. In other words, fogging was completely suppressed. As the result, the recording paper gave a contrast ratio higher than 1.0 (in terms of reflectance density).

The electrolytic paper which had undergone recording was immersed in hot water at 60° C. for 30 minutes. The color tone changed into a reddish purple color, but the contrast ratio remained unchanged. In other words, the color fixing was very good. That part of the material layer in which color development took place remained unchanged even when it was kept in contact with ethanol dropped thereon for about 30 minutes. Such good color fixing has not been achieved with conventional electrolytic recording paper.

EXPERIMENTAL EXAMPLE 6

This experimental example was carried out to apply the display composition of the present invention to the material layer of electrolytic recording paper having a different structure from that in Experimental Example 5.

The electrolytic recording paper used in this experimental example is designed to be applied to the recording system as shown in FIG. 4(C). It is characterized by that the substrate has electrical conductivity. Neutralized paper (about 100 μm thick) as a substrate was dipped in a solution composed of 1 part by weight of perchloric acid tetra-n-decylammonium, 3 parts by weight of ethylene carbonate, and 30 parts by weight of acetone. After dipping, the paper was dried with hot air. The dipping and drying steps were repeated. The resulting electrically conductive substrate (32) has almost the same degree of whiteness as untreated neutralized paper. It became slightly transparent when heated to 100° C.

The electrolyte that can be used for this purpose is not limited to perchloric acid tetra-n-decyl ammonium, but it includes any electrolyte which does not inhibit the fixing reaction of the dye (or has a weaker affinity for the clay mineral than the color-forming dye). Whether or not an electrolyte in question causes inhibition may be tested in the following manner. The dye-clay composite is immersed for one day in a solution containing the electrolyte sample (1 mg equivalent for 1 g of the dye-clay composite). The electrolyte sample passes the test if the liquid phase does not assume any color or the dye-clay composite does not discolor.

The coating solution obtained in Experimental Example 5 was applied using a doctor knife to the electrically conductive substrate (32) prepared as mentioned above. After drying with hot air at 150° C. and cooling to room temperature, there was obtained the electrolytic recording paper (31) having the material layer (33), which was slightly yellowish.

The electrolytic recording paper was used for recording by the recording system as shown in FIG. 4(C). The head (34) is an iron plate (100 mm long and 1 mm wide), and the counter electrode (35) is an aluminum roller (50 mm in diameter), which was kept at 100° C. The electrolytic recording paper (31) was run at a speed of 10 mm/sec under pressure against the aluminum roller.

Under the above-mentioned condition, a DC voltage of 80 V was selectively applied across the head (34) (anode) and the counter electrode (35) (cathode). That part of the recording paper to which voltage was applied turned into black, forming a strip pattern after the sectional shape of the head (34). This pattern was very sharp. This suggests the possibility of recording with a high resolution. No deformation occurred in the recording layer after heating and running under pressure.

The electrolytic recording paper (31) retained its color formed thereon even after immersion in hot water at 60° C. for 30 minutes. No color was visible on the back side of the substrate (32) (on which the material layer (33) was not formed). This suggests that the dye which had formed a color was stably fixed in the material layer (33) and the electrolyte contained in the electrically conductive substrate (32) does not interfere with this fixing.

EXPERIMENTAL EXAMPLE 7

This experimental example was carried out to apply the electrolytic recording paper obtained in Experimental Example 6 to the recording system as shown in FIG. 4(D).

The head (34) is a copper plate (100 mm long and 1 mm wide), and the insulating roller (39) is a rubber roller. The head (34) was kept at 100° C. The electrolytic recording paper (31) and aluminum-deposited PET film (38) were run at a speed of 5 mm/sec. Under this condition, a DC voltage from 0 to 80 V was selectively applied at an increment of 10 V across the head (34) (anode) and the aluminum deposite layer (36) (cathode). After the peeling of the aluminum-deposited PET film (38), the material layer (33) showed a colored strip pattern having gradation according to the voltage applied. This result indicates that the electrolytic recording paper is capable of recording with gradation. In addition, the color formed for recording remained very stable.

It is evident from the foregoing that the present invention provides a display composition having the fixing mechanism therein. The display composition, after its color formation, can be used as an extremely stable coloring pigment having good solvent resistance. Especially, the present invention provides a coloring pigment containing a lipophilic dye.

The display composition can be applied to recording materials such as electrolytic recording paper to achieve high recording sensitivity, resolution, and fixing performance. Such recording materials have several advantages such as ease of production; freedom from fogging, sticking of the recording material to the head, shorting between the heads, and deformation of the recording layer; no necessity for expendables other than the recording material; no waste material; and possibility of applying to the rewritable medium by utilizing the reversible color development and color fading. Thus the present invention is of great practical value.

What is claimed is:

1. A recording material which comprises a substrate and a material layer formed thereon, said material layer containing a support electrolyte, a dye, which will undergo a color development, a color fading and a color change in response to an oxidation-reduction reaction, and a clay mineral in which quaternary ammonium ions are bound between layers through ion exchange, said material layer undergoing oxidation and reduction upon the application of a voltage and the application of a voltage of reverse polarity, respectively, the oxidation causing said dye to form a color and to be bound between the layers of said clay mineral through ion exchange with said quaternary ammonium ions, the reduction causing the dye to discolor and to be desorbed out of the interlaminar space of the clay mineral and also causing the quaternary ammonium ions to be bound again between the layers through ion exchange.

* * * * *